(12) United States Patent
Fujita et al.

(10) Patent No.: US 11,260,897 B2
(45) Date of Patent: Mar. 1, 2022

(54) STEER-BY-WIRE STEERING DEVICE AND VEHICLE

(71) Applicant: Hitachi Astemo, Ltd., Hitachinaka (JP)

(72) Inventors: Hiroshi Fujita, Tochigi (JP); Hirotoshi Uchibori, Tochigi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/053,167

(22) PCT Filed: May 30, 2019

(86) PCT No.: PCT/JP2019/021507
§ 371 (c)(1),
(2) Date: Nov. 5, 2020

(87) PCT Pub. No.: WO2019/239908
PCT Pub. Date: Dec. 19, 2019

(65) Prior Publication Data
US 2021/0163060 A1    Jun. 3, 2021

(30) Foreign Application Priority Data

Jun. 12, 2018 (WO) .................. PCT/JP2018/022410

(51) Int. Cl.
*B62D 5/00* (2006.01)
*B62D 1/04* (2006.01)
(Continued)

(52) U.S. Cl.
CPC .............. *B62D 5/001* (2013.01); *B62D 1/04* (2013.01); *B62D 1/16* (2013.01); *B62D 5/0454* (2013.01)

(58) Field of Classification Search
CPC .......... B62D 5/001; B62D 5/005; B62D 1/04; B62D 1/16
See application file for complete search history.

(56) References Cited

U.S. PATENT DOCUMENTS

| 2003/0005757 A1* | 1/2003 | Koeune | ................. B60C 19/003 |
| | | | 73/146 |
| 2013/0228391 A1* | 9/2013 | Tashiro | .................. B62D 5/001 |
| | | | 180/402 |

(Continued)

FOREIGN PATENT DOCUMENTS

| DE | 10312516 A1 * | 10/2003 | ............. B62D 5/001 |
| DE | 102018218484 A1 * | 4/2020 | ............. B62D 5/001 |

(Continued)

OTHER PUBLICATIONS

International Search Report, dated: Aug. 13, 2019 (Aug. 13, 2019), 2 pages.

*Primary Examiner* — Jonathan Ng
*Assistant Examiner* — Scott F. Underwood
(74) *Attorney, Agent, or Firm* — Rankin, Hill & Clark LLP

(57) ABSTRACT

A steer-by-wire steering device includes a first member, a second member, and a stopper. The first member includes a first base surrounding an input shaft and rotatable, a first protrusion protruding from the first base in a radial direction or in an axial direction, and a first weight provided on the first base so as to make a weighted center consistent with a center of the input shaft. The second member is rotatable together with the first member with the first protrusion being abutting the second protrusion. The stopper is provided on a trajectory of the second protrusion, and is capable of restricting the turn of a steering wheel via the input shaft when abutting with the second protrusion.

18 Claims, 10 Drawing Sheets

(51) Int. Cl.
*B62D 1/16* (2006.01)
*B62D 5/04* (2006.01)

(56) References Cited

U.S. PATENT DOCUMENTS

| | | | | |
|---|---|---|---|---|
| 2014/0222260 | A1* | 8/2014 | Anson | B63H 25/42 |
| | | | | 701/21 |
| 2018/0105198 | A1* | 4/2018 | Bodtker | B62D 5/005 |
| 2018/0238377 | A1* | 8/2018 | Kim | B62D 6/10 |
| 2018/0362079 | A1* | 12/2018 | Zuzelski | B62D 3/02 |
| 2020/0039572 | A1* | 2/2020 | Appleyard | B62D 1/16 |
| 2020/0130725 | A1* | 4/2020 | Ishimura | B62D 5/005 |

FOREIGN PATENT DOCUMENTS

| | | | | |
|---|---|---|---|---|
| DE | 102019111992 A1 * | 11/2020 | | B62D 5/001 |
| JP | 10-194152 | 7/1998 | | |
| WO | WO-2019207708 A1 * | 10/2019 | | B62D 5/04 |

* cited by examiner

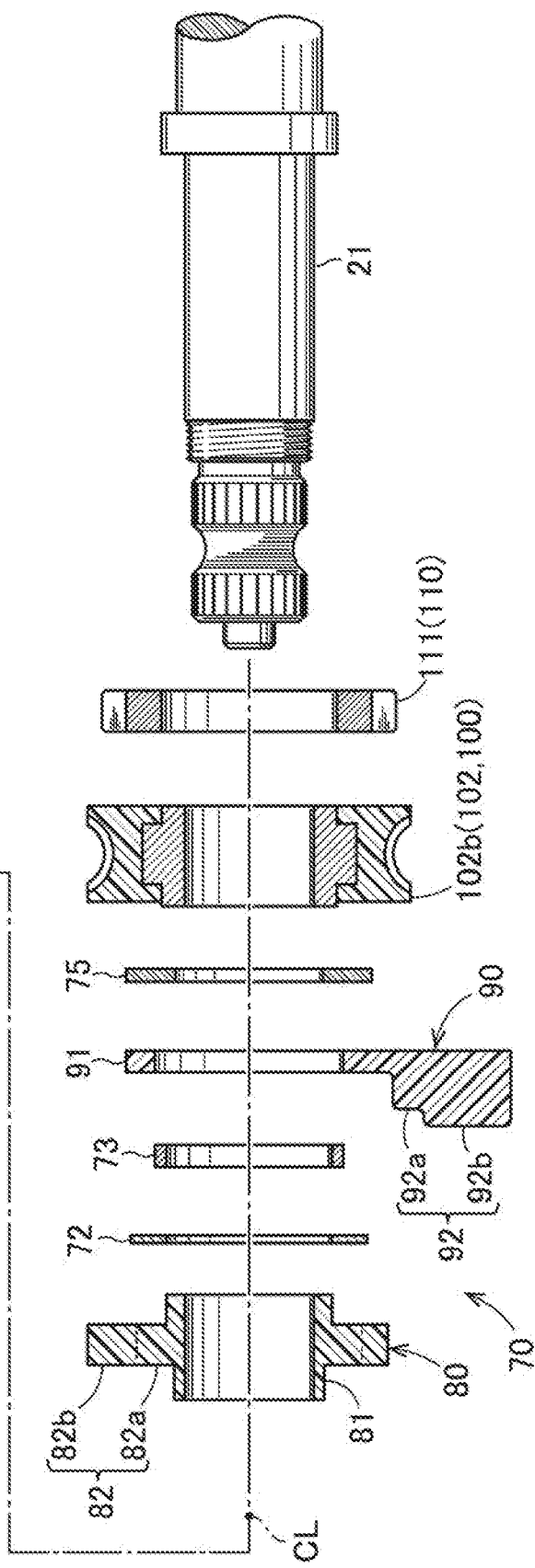
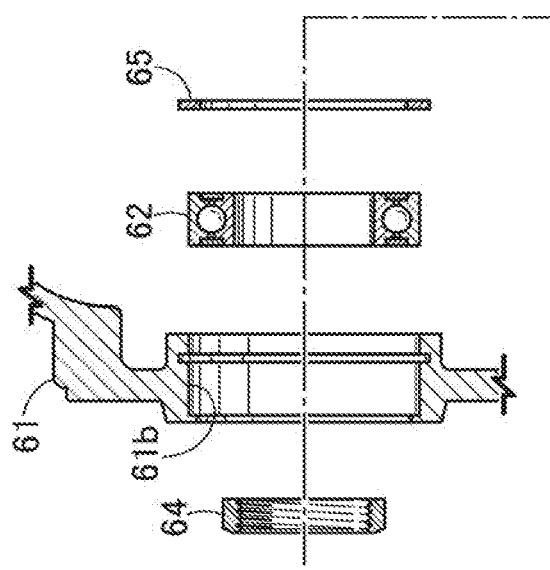
FIG.3

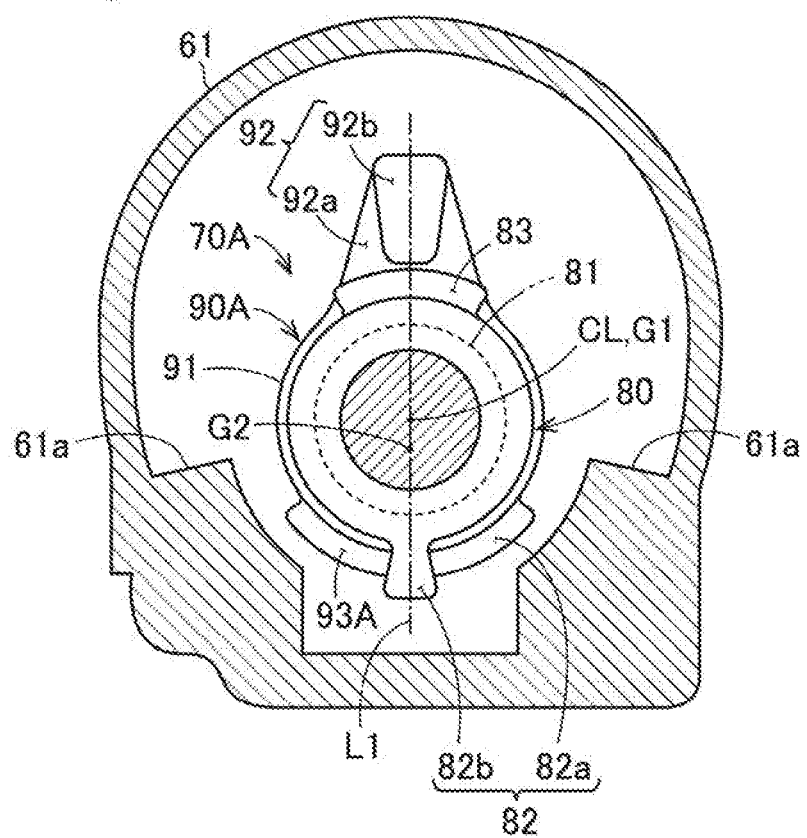

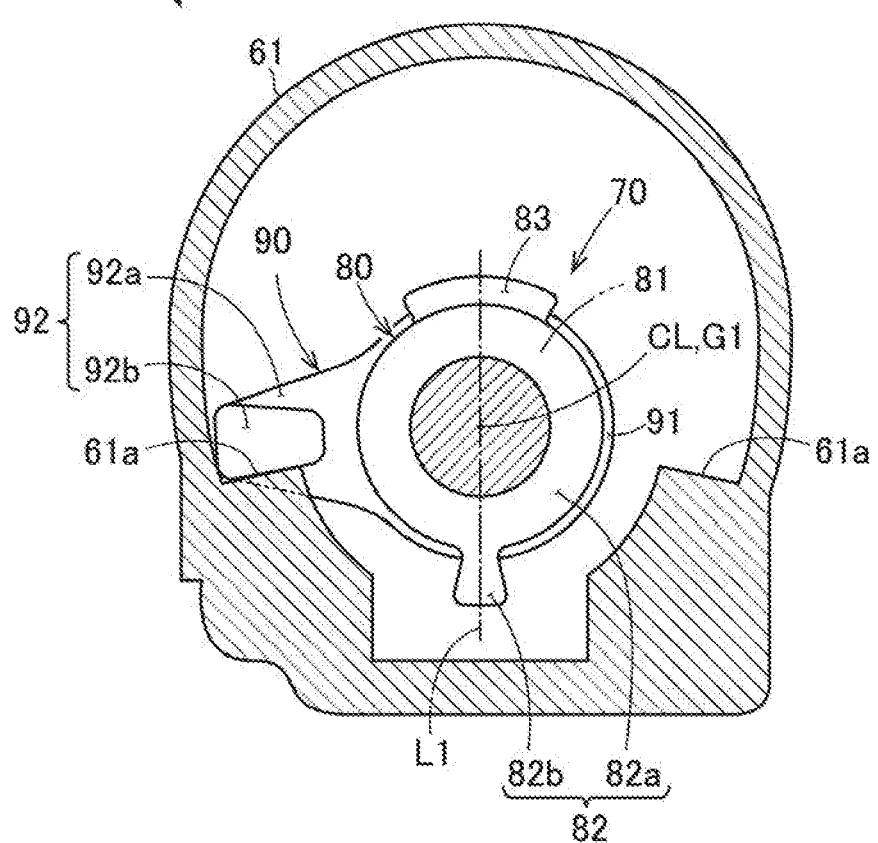

STEER-BY-WIRE STEERING DEVICE AND VEHICLE

TECHNICAL FIELD

The present disclosure relates to a steer-by-wire steering device that restricts a turnable angle of a steering wheel.

BACKGROUND ART

Regarding steering devices for vehicles, etc., a steer by wire (steer-by-wire) system has been known which has an input shaft rotatable together with a steering wheel and disengaged from turn wheels. Various steering devices which are capable of restricting a turnable angle of the steering wheel have been proposed. A technology as such a steering device is disclosed in, for example, the following Patent Document 1.

The steering device disclosed in Patent Document 1 includes an input shaft that is rotated by turning a steering wheel, a slit member which is provided so as to spin around relative to the input shaft and which has an elongated hole opened along the circumference direction of the input shaft, a pin which passes completely through the elongated holed of the slit member, and which has a tip fitted in the input shaft, and a stopper formed so as to be able to abut the slit member.

When a driver turns the steering wheel, the pin rotates together with the input shaft. The slit member does not rotate while the pin is moving within the elongated hole. When the steering wheel is further turned, the pin moves to the end of the elongated hole and abuts the slit member. When the steering wheel is further turned, the slit member pushed by the pin also rotates. When the steering wheel is turned by a predetermined amount, a part of the slit member abuts the stopper, and thus the rotation of the steering wheel is restricted.

The steering device restricts the turnable angle of the steering wheel by the length of the elongated hole and by the position of the stopper.

CITATION LIST

Patent Literatures

[Patent Document 1] JP H10-194152A

SUMMARY OF INVENTION

Technical Problem

According to the steering device disclosed in Patent Document 1, the pin protrudes from the input shaft. Force by the gravity is applied to the input shaft in the rotation direction by what corresponds to the weight of the pin. According to conventional steering devices, friction force between the wheel and the ground prevents the input shaft from being rotated. According to steer-by-wire steering devices, however, the end of the input shaft is disengaged from the end of the wheel shaft. Hence, the input shaft is likely to be rotated together with the steering wheel when not intended by the driver by the above-described force in the rotation direction due to the gravity which is smaller than conventional force.

An objective of the present disclosure is to provide a technology which is capable of restricting the turnable angle of a steering wheel, and which is also capable of causing the steering wheel to be turned as appropriate.

Solution to Problem

The inventors of the present disclosure found, upon keen research and development activities, it becomes possible to cause a steering wheel to be turned as appropriate by providing a first weight on a first base so as to make the weighted center of a first member consistent with the center of an input shaft. The present disclosure is accomplished based on such a find.

The present disclosure will be described below. In the following description, in order to facilitate understanding to the present disclosure, a reference numeral in the accompanying figures will be denoted, but this does not limit the scope of the present disclosure to illustrated embodiments.

According to an embodiment of the present disclosure, a steer-by-wire steering device is provided which includes:

a first member 80 which includes a first base 81 surrounding an input shaft 21 to be rotated when a steering wheel 11 is turned, and rotatable together with the input shaft, a first protrusion 82 protruding from the first base 81 in a radial direction or in an axial direction, and a first weight 83 provided on the first base 81 so as to make a weighted center G1 of the first member consistent with a center of the input shaft 21;

a second member 90, 90A, 90B which includes a second base 91 surrounding the first base 81, and a second protrusion 92 protruding from the second base 91 and on a trajectory of the first protrusion 82, the second member being rotatable together with the first member 80 with the first protrusion 82 being abutting the second protrusion 92; and a stopper 61a, 121 which is provided on a trajectory of the second protrusion 92, and is capable of restricting the turn of the steering wheel 11 via the input shaft 21 when abutting with the second protrusion 92.

In addition, when the first member 80 is viewed from the front side, the first weight 83 may be placed so as to overlap a line L1 extended from the first protrusion 82 and passing through the center of the input shaft 21.

Moreover, the position of a weighted center G2 of the second member 90, 90A may be offset relative to a center CL of the input shaft 21 by the second protrusion 92, and the stopper 61a is formed outwardly relative to the trajectory of rotation of the second protrusion of the second member 90, 90A by the gravity from the maximum reachable position where the second protrusion 92 abuts the first protrusion 82 and is rotatable to the standstill position balanced by the gravity.

The second member 90A may further include a second weight 93A.

The second weight 93A may form a weighted center G2 of the second member 90A so as to rotate, when the second protrusion 92 rotates from a maximum reachable position where the second protrusion abuts the first protrusion 82 and is rotatable to a standstill position balanced by the gravity, the second member from the maximum reachable position and in a direction becoming apart from the stopper 61a.

The second member 90B may further include a second weight 93B, and a weighted center G2 of the second member 90B may be consistent with a center CL of the input shaft 21.

According to another embodiment of the present disclosure, a steer-by-wire steering device is provided which includes:

a first member 80 which includes a first base 81 surrounding an input shaft 21 to be rotated when a steering wheel 11 is turned, and rotatable together with the input shaft, a first protrusion 82 protruding from the first base 81 in a radial direction or in an axial direction, and a first weight 83 provided on the first base 81 so as to make a weighted center G1 consistent with a center CL of the input shaft 21;

a second member 90 which includes a second base 91 surrounding the first base 81, and a second protrusion 92 protruding from the second base 91 and on the trajectory of the first protrusion 82, the second member being rotatable together with the first member 80 with the first protrusion 82 being abutting the second protrusion 92, a weighted center G2 being located between the center of the input shaft 21 and the second protrusion 92; and a stopper 61a which is apart from the second protrusion 92, and is formed above the center CL of the input shaft 21 on the trajectory of the second protrusion 92 when the weighted center G2 of the second member 90 is located below the center CL of the input shaft 21, and is capable of restricting the turn of the steering wheel 11 via the input shaft 21 when abutting with the second protrusion 92.

Furthermore, according to the other embodiment of the present disclosure, a steer-by-wire steering device is provided which includes:

a first member 80 which includes a first base 81 surrounding an input shaft 21 to be rotated when a steering wheel 11 is turned, and rotatable together with the input shaft, a first protrusion 82 protruding from the first base 81 in a radial direction or in an axial direction, and a first weight 83 provided on the first base 81 so as to make a weighted center G1 consistent with a center CL of the input shaft 21;

a second member 90A which includes a second base 91 surrounding the first base 81, a second protrusion 92 protruding from the second base 91 and on the trajectory of the first protrusion 82, and a second weight 93A placed so as to overlap a line L1 extended from the second protrusion 92 and passing through the center CL of the input shaft 21, the second member being rotatable together with the first member 80 with the first protrusion 82 being abutting the second protrusion 92, a weighted center G2 being located between the center CL of the input shaft 21 and a tip of the second weight 93A; and a stopper 61a which is apart from the second protrusion 92 and is formed on the trajectory of the second protrusion 92 when the weighted center G2 of the second member 90A is located below the center CL of the input shaft 21, and is capable of restricting the turn of the steering wheel 11 via the input shaft 21 when abutting with the second protrusion 92.

Preferably, a vehicle includes one of the above-described steer-by-wire steering devices.

Advantageous Effects of Invention

According to the present disclosure, a technology is provided which is capable of restricting the turnable angle of a steering wheel, and which is also capable of causing the steering wheel to be turned as appropriate.

BRIEF DESCRIPTION OF DRAWINGS

FIG. 3 is an exploded view of the steering angle restricting device illustrated in FIG. 2;

FIG. 7 is a diagram for describing a major section of a steer-by-wire steering device according to a second embodiment;

FIG. 10 is a diagram for describing a major section of a steer-by-wire steering device according to a fourth embodiment.

DESCRIPTION OF EMBODIMENTS

Embodiments of the present disclosure will be described below with reference to the accompanying figures. Note that in the following description, the terms right and left mean the right and left sides with reference to a person in a vehicle, and the terms front and rear mean the front and rear sides with reference to the travelling direction of the vehicle. Moreover, Fr, Rr, Le, Ri, Up, and Dn in the figures indicate the front side, the rear side, the left side as viewed from the person in the vehicle, the right side as viewed from such a person, the upper side, and the lower side, respectively. The embodiments illustrated in the accompanying figures are merely examples of the present disclosure, and the present disclosure is not limited to such embodiments.

First Embodiment

Figure 1:
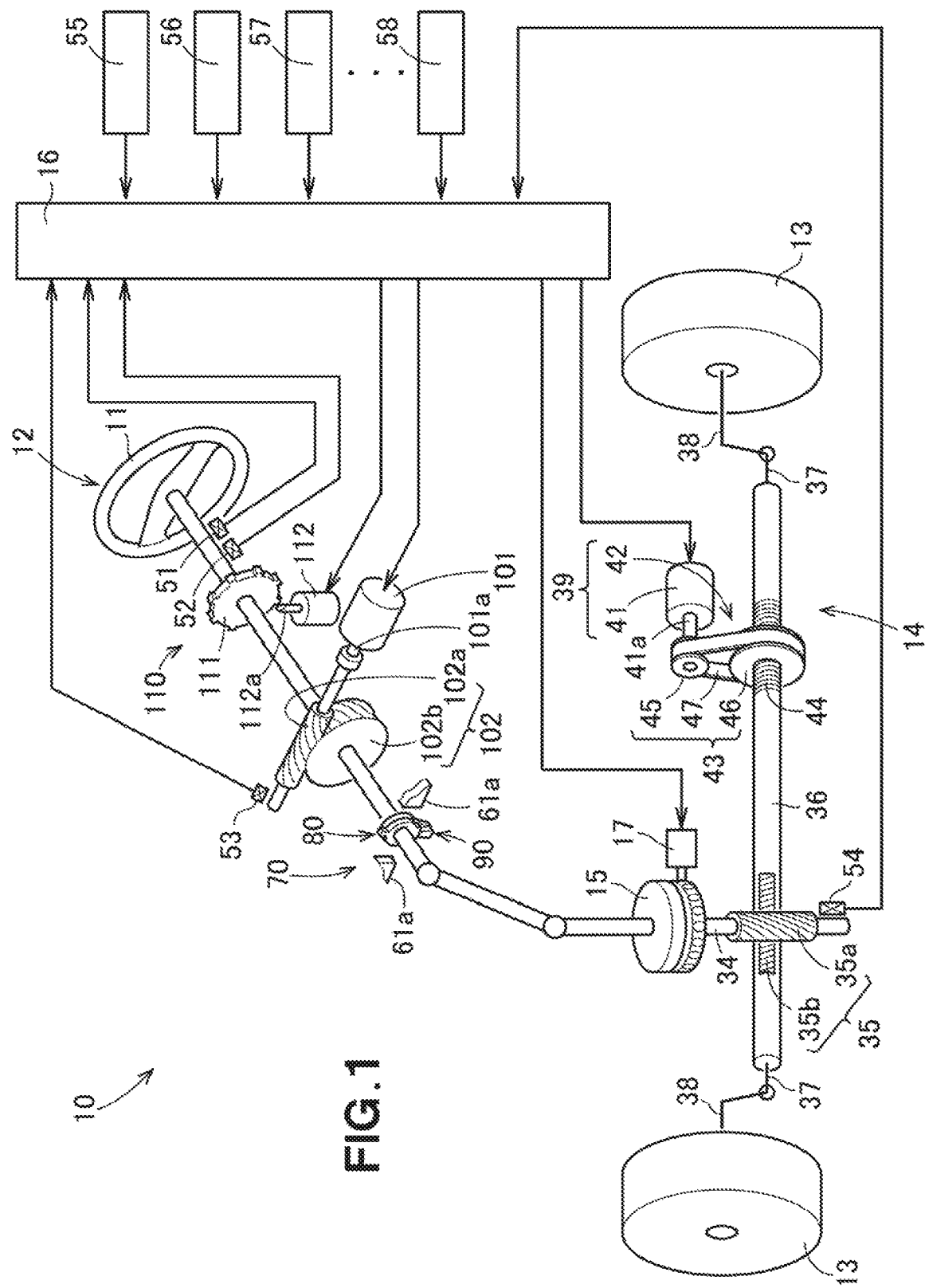
FIG. 1 is a diagram exemplarily illustrating a steer-by-wire steering device according to a first embodiment.

With reference to FIG. 1, a steer-by-wire steering device 10 (referred to as a "steering device 10" below) according to a first embodiment is illustrated in FIG. 1. The steering device 10 includes a steering unit 12 where a steering input through a vehicular steering wheel 11 is caused, a turning unit 14 that turns right and left turn wheels 13 and 13, a clutch 15 present between the steering unit 12 and the turning unit 14, and a control unit 16.

In a normal condition, the clutch 15 is in an unlatched state, and the steering unit 12 and the turning unit 14 are mechanically separated from each other. That is, in a normal condition, respective ends of the steering unit 12 and of the turning unit 14 are disengaged from each other. The steering device 10 employs a scheme so-called a steer by wire (steer-by-wire, an "SBW" as an abbreviated expression) scheme that turns the right and left turn wheels 13 and 13 by actuating a turn actuator 39 in accordance with the steered amount of the steering wheel 11.

In an emergency condition, a changer 17 that has received an electrical signal from the control unit 16 is actuated, and causes the clutch 15 to be latched. This causes the steering unit 12 and the turning unit 14 to be mechanically connected with each other.

The steering unit 12 includes the steering wheel 11 to be operated by a driver, and an input shaft 21 that is coupled to the steering wheel 11.

Provided on the input shaft 21 is a steering angle restricting device 70 that restricts a turnable angle of the steering wheel. The steering angle restricting device 70 will be described below in detail.

The turning unit 14 includes an output shaft 34 coupled to the input shaft 21 via the clutch 15, a turn shaft 36 coupled to the output shaft 34 via an operation-force transmission mechanism 35, right and left tie rods 37 and 37 provided at ends of the turn shaft 36, respectively, right and left king pins 38 and 38 connected to the right and left turn wheels 13 and 13, respectively, via the respective right and left tie rods 37 and 37, and the turn actuator 39 that applies turn force to the turn shaft 36.

The operation-force transmission mechanism 35 is, for example, a rack and pinion mechanism. The rack and pinion mechanism 35 (the operation-force transmission mechanism 35) includes a pinion 35a provided on the output shaft 34, and a rack 35b provided on the turn shaft 36. The turn shaft 36 is movable in the axial direction (a vehicle widthwise direction).

The turn actuator 39 includes a turn-force motor 41 that produces the turn force, and a turn-force transmission mechanism 42 that transmits turn force to the turn shaft 36. The turn force produced by the turn-force motor 41 is transmitted to the turn shaft 36 by the turn-force transmission mechanism 42. Consequently, the turn shaft 36 slides in the vehicle widthwise direction. The turn-force motor 41 is, for example, an electric motor.

The turn-force transmission mechanism 42 includes, for example, a belt drive mechanism 43, and a ball screw 44. The belt drive mechanism 43 includes a driven pulley 45 provided at a motor shaft 41a of the turn-force motor 41, a follower pulley 46 provided at the nut of the ball screw 44, and a belt 47 tensioned between the driven pulley 45 and the follower pulley 46.

The ball screw 44 is a kind of conversion mechanisms that convert rotational motion into linear motion, and transmits the drive force produced by the turn-force motor 41 to the turn shaft 36. Note that the turn-force transmission mechanism 42 is not limited to a structure that employs the belt drive mechanism 43 and the ball screw 44, and may employ, for example, a worm gear mechanism or a rack and pinion mechanism.

The control unit 16 receives respective detection signals from a steering angle sensor 51, a steering torque sensor 52, a motor rotation angle sensor 53, an output shaft rotation angle sensor 54, a vehicle speed sensor 55, a yaw rate sensor 56, an acceleration sensor 57, and other various sensors 58, and applies, in response to the received detection signal, a current to the clutch 15, the changer 17, the turn-force motor 41, and reactive-force motor 101 and stopper main body 112 both described in detail later.

The steering angle sensor 51 detects the steering angle of the steering wheel 11. The steering torque sensor 52 detects steering torque produced on the input shaft 21. The motor rotation angle sensor 53 detects the rotation angle of the reactive-force motor 101. The output shaft rotation angle sensor 54 detects the rotation angle of the output shaft 34 that has the pinion 35a. The vehicle speed sensor 55 detects the running speed of the vehicle. The yaw rate sensor 56 detects a yaw angular speed (the angular speed of yaw motion). The acceleration sensor 57 detects the acceleration of the vehicle. The other various sensors 58 include a rotation angle sensor that detects the rotation angle of the turn-force motor 41. The rotation angle sensor is formed by, for example, a resolver provided on the turn-force motor 41.

Figure 2:
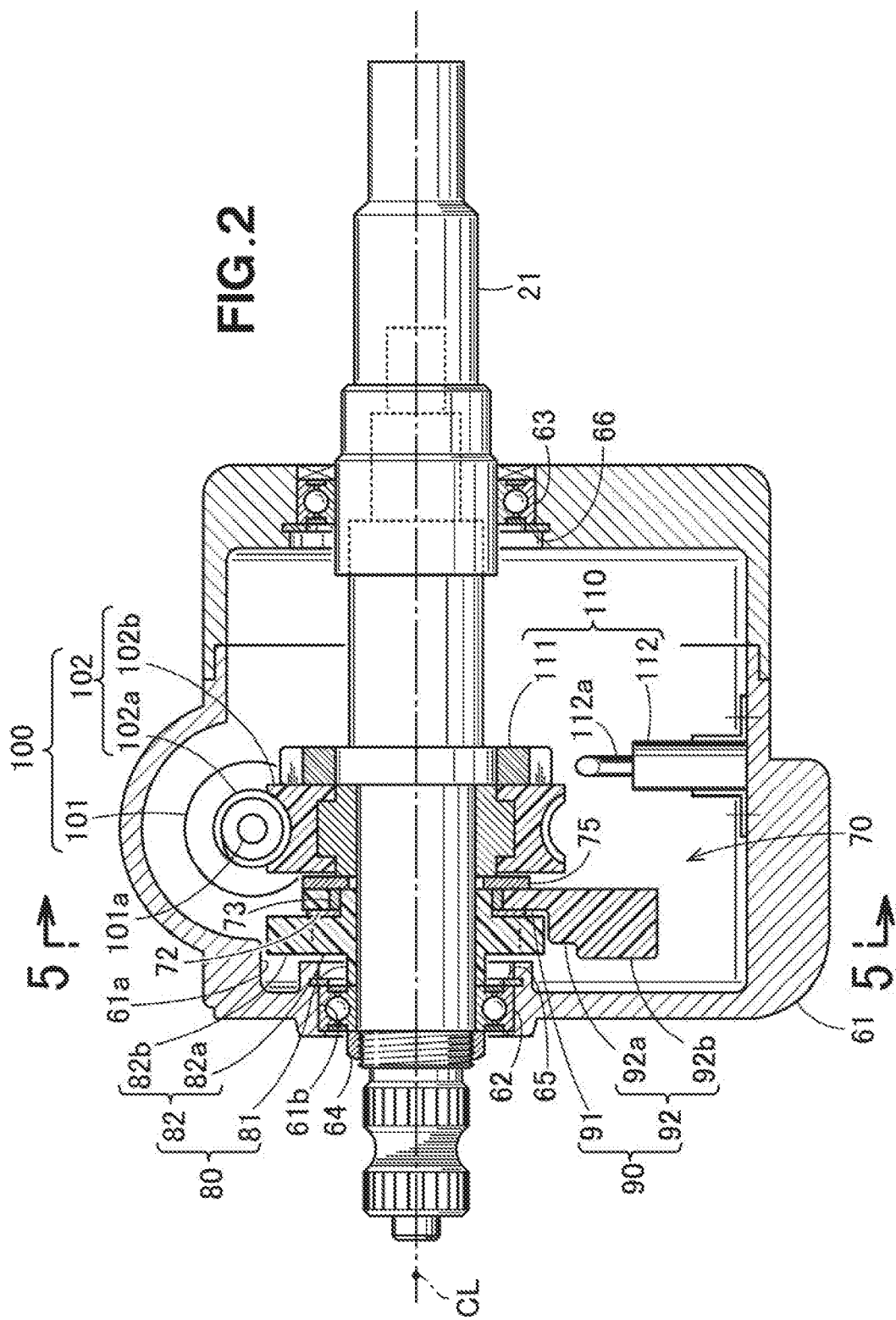
FIG. 2 is a cross-sectional view of a steering angle restricting device illustrated in FIG. 1.

FIG. 2 illustrates a cross-sectional structure around the input shaft 21. The input shaft 21 passes completely through a housing 61, and is supported by the housing 61 so as to be freely rotatable via ball bearings 62 and 63. The steering angle restricting device 70 is held in the housing 61. The housing 61 is provided with a housing recess 61b that prevents the ball bearing 62 from being detached in the downward direction in FIG. 2.

The housing 61 can be formed of arbitrary materials.

The nut 64 is fastened to the input shaft 21. The nut 64 is capable of abutting the inner race of the ball bearing 62, and restricts the movement of the input shaft 21 in the right direction in the figure.

The ball bearings 62 and 63 are prevented from being detached from the housing 61 by, for example, C-rings 65 and 66, respectively, formed in the letter C-shape.

With reference to also FIG. 3, the steering angle restricting device 70 includes a first member 80 which is fastened to the input shaft 21 and which is rotatable together with the input shaft 21, first and second bearing 72 and 73 which are provided on the outer circumference of the first member 80 and which are each formed of a metal ring, a second member 90 placed on the outer circumference of the first member 80 via the first and second bearing 72 and 73, a stopper 61a which is provided on the trajectory of the second member 90 and which is formed by a part of the housing 61, a third bearing 75 formed by a metal ring capable of abutting the first member 80 and the second member 90, a reactive-force applying mechanism 100 which is located adjacent to the third bearing 75 and which applies torque in the opposite direction to the rotation of the input shaft 21, and an arbitrary angle stopper 110 which is located adjacent to the reactive-force applying mechanism 100 and which stops the rotation of the input shaft 21 at an arbitrary angle.

Figure 4:
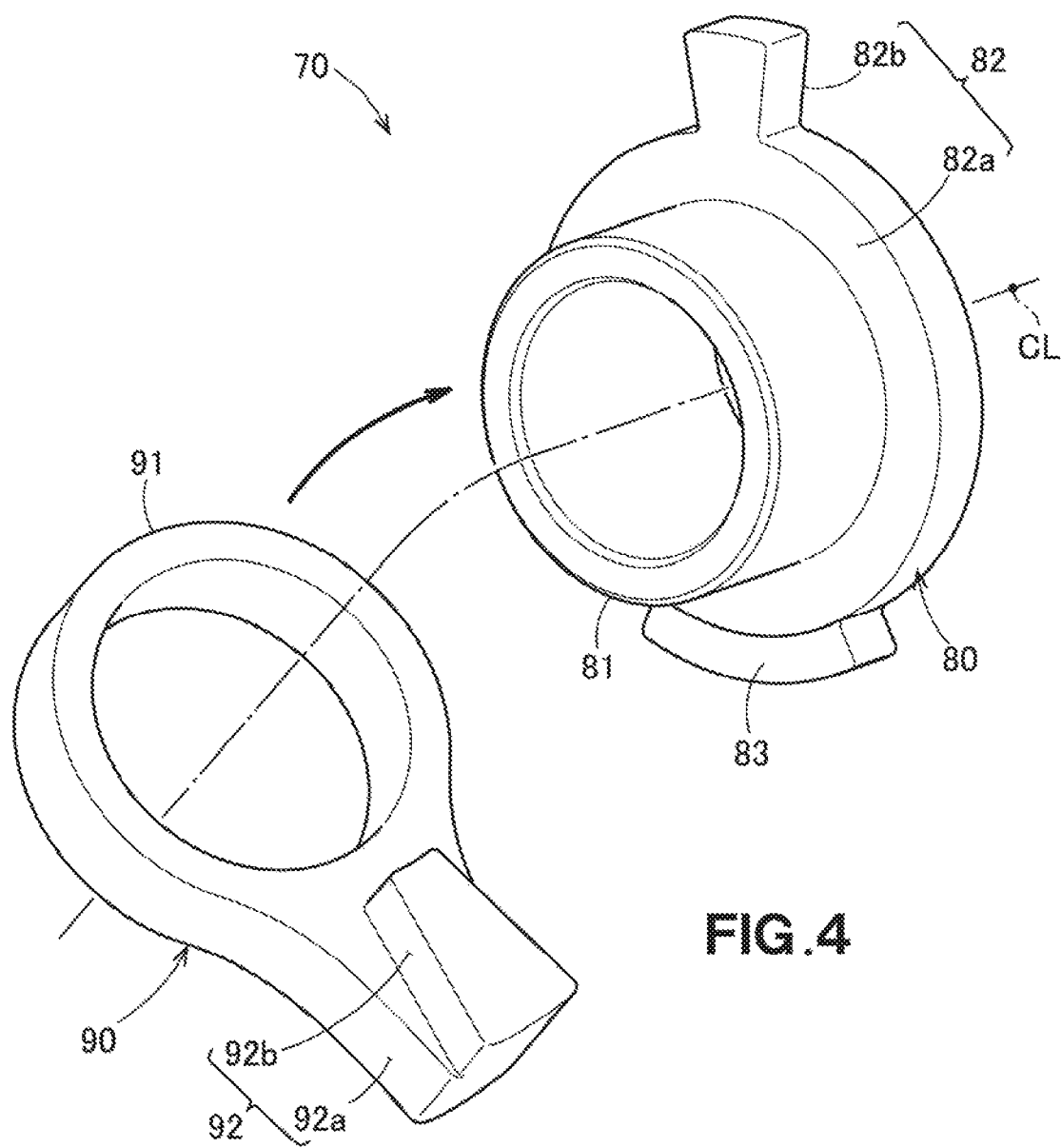
FIG. 4 is an exploded perspective view of a first member and of a second member both illustrated in FIG. 2.

With reference to FIG. 2 and to FIG. 4 the first member 80 includes a first base 81 which is fastened to the input shaft 21 and which is rotatable together with such an input shaft, a first protrusion 82 that protrudes in the radial direction from the first base 81, and a first weight 83 provided integrally with the first base 81.

Regarding the material of the first member 80, an arbitrary material like a high rigidity material, such as metal or ceramic, or an elastic material, such as a rubber or an elastic resin, is selectable. Regarding the material of the first weight 83, a different material from those of the first base 81 and the first protrusion 82 may be applicable. The first member 80 may be molded by two-color molding or insert molding.

With the steering angle restricting device 70 being formed, and one end of the other member that can be displaced in the axial direction along the input shaft 21 being abutting another component that cannot be displaced in the axial direction, one end of the first base 81 parallel to a rotation axis CL of the first member 80 in the axial direction may be configured to abut the other end of such a component.

Moreover, when two other components which are located at ends in the axial direction parallel to the rotation axis CL of the first member 80, respectively, and which form the steering angle restricting device 70 can be displaced in the axial direction along the input shaft 21, the maximum apart distance between such two other components and the length of the first base 82 in the axial direction may be designed so as to be consistent with each other.

Such a structure disables the other members 62 and 75 to be displaced in the axial direction, eliminating the necessity of a component dedicated for suppressing a backlash and a detachment. Hence, reduction in number of components, etc., can be accomplished. This is advantageous in view of costs, etc. In other words, the first base 81 also serves as a positioning member for the other member that forms the steering angle restricting device 70.

For example, as illustrated in FIG. 2, a structure is employed in which, with the lower end of the ball bearing 62 abutting the housing recess 61b, the lower end of the first base 81 in the axial direction parallel to the rotation axis of the first member 80 in the figure abuts the upper end of the ball bearing 62. This disables the ball bearing 62 to be displaced in the axial direction, and thus a backlash and a detachment can be suppressed.

Moreover, as illustrated in FIG. 2, for example, a structure is employed in which, with the upper end of the third bearing 75 abutting the worm 102a press-fitted and fastened to the input shaft, the upper end of the first base 81 in the axial direction parallel to the rotation axis of the first member 80 in the figure abuts the lower end of the third bearing 75. This disables the third bearing 75 to be displaced in the axial direction, and thus a backlash of the third bearing 75 can be suppressed. This enables the third bearing 75 to have a large dimensional tolerance in inner diameter relative to the outer diameter of the input shaft 21.

The first protrusion 82 may further include an annular portion 82a formed annularly along the outer circumference of the first base 81. In this case, the term radial direction means a direction that extends radially around the axial line CL of the input shaft 21.

The annular portion 82a is formed along the entire outer circumference of the first base 81. This prevents the first bearing 72, the second bearing 73, and the second member 90 from being detached and from having a backlash.

Figure 5:
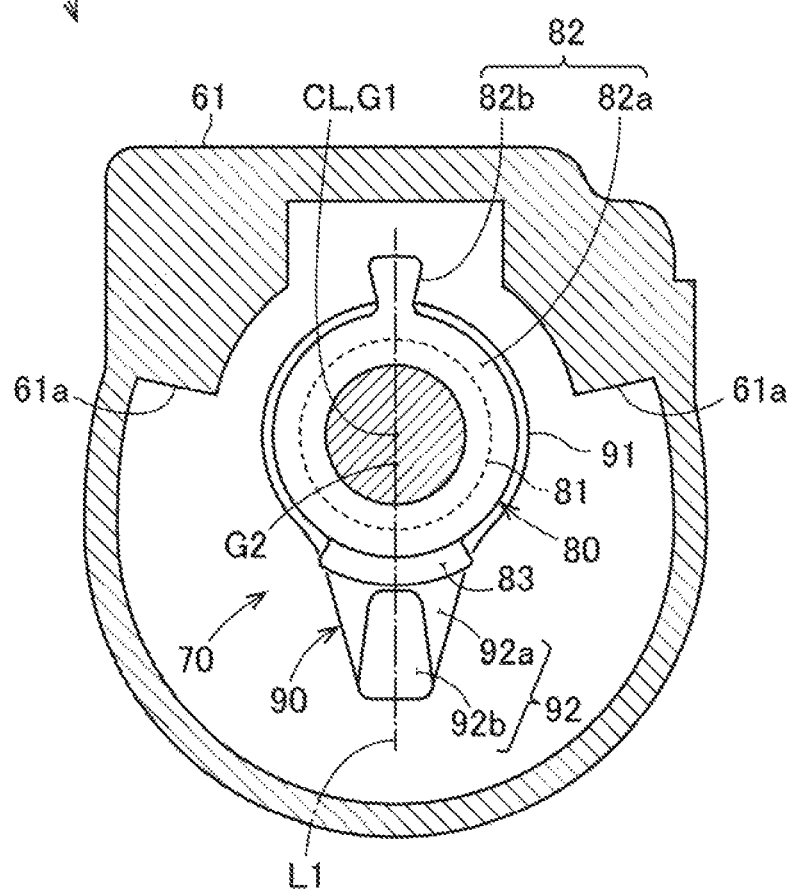
FIG. 5 is a cross-sectional view taken along a line 5-5 in FIG. 2.

With reference to FIG. 4 and FIG. 5, the first weight 83 is formed at a position opposite to the first protrusion 82 across the center CL of the input shaft 21. In other words, when the first member 80 is viewed from the front side, the first weight 83 is placed so as to overlap a line L1 that extends from the first protrusion 82 and passing through the center CL of the input shaft 21. The first weight 83 is formed integrally with the first base 81 as a singular component therewith along the outer circumference of the first base 81. A weighted center G1 of the first member 80 is adjusted by the first weight 83 so as to be consistent with the center CL of the input shaft 21.

This prevents, according to the steering angle restricting device of this embodiment, the first protrusion 82 from being pulled by the gravity and rotated regardless of the angle of the first member 80.

Hence, the steering wheel can be turned as appropriate. In other words, the steering wheel is turned only by external force like the driving operation by the driver, and a likelihood such that the first protrusion 82 is pulled by the gravity and rotated together with the input shaft and with the steering wheel is suppressed.

Note that the expression consistency of the weighted center covers all scopes that accomplish the advantageous effects of addressing the above-described problem to be solved and of causing the steering wheel to be turned as appropriate.

The second member 90 includes a second base 91 in a substantially annular shape surrounding the first base 81, and a second protrusion 92 that protrudes from the second base 91 and on the trajectory of the first protrusion 82. A feature such that the second protrusion 92 is located above the trajectory of the first protrusion 82 will be described later in detail. The second member 90 is located between both ends of the first base 81.

A weighted center G2 of the second member 90 is located at the closer position to the second protrusion 92 than the center CL of the input shaft 21 by what corresponds to the protruding second protrusion 92 from the annular second base 91. That is, the weighted center G2 of the second member 90 is offset relative to the center CL of the input shaft 21.

Regarding the material of the second member 90, an arbitrary material, such as a metal, a rubber, or a resin, is selectable.

The second protrusion 92 includes a radial-direction protrusion 92a that protrudes in the radial direction from the second base 91, and an axial-direction protrusion 92b that protrudes in the direction along the axial line CL from the radial-direction protrusion 92a.

Although an abutment portion 82b and the axial-direction protrusion 92b may be in any shape, it is preferable that those are formed in a substantially trapezoidal shape and to have respective portions corresponding to the inclined sides of the respective trapezoids directed in the same direction so as to ensure a large contact area therebetween.

With reference to FIG. 2, the reactive-force applying mechanism 100 includes a reactive-force motor 101 (a motor 101) through which a current in accordance with the torque by the input shaft 21 is caused to flow, and a reactive-force transmission mechanism 102 that transmits steering reactive force to the input shaft 21.

The reactive-force motor 101 is, for example, an electric motor. The control unit 16 supplies the current to the reactive-force motor 101, and actuates such a motor.

The reactive-force transmission mechanism 102 is a worm gear mechanism. The reactive-force transmission mechanism 102 includes a worm 102a provided on a motor shaft 101a of the reactive-force motor 101, and a worm wheel 102b which is meshed with the worm 102a, is provided on the input shaft 21, and rotates together with the rotation of the worm 102a. The steering reactive force produced by the reactive-force motor 101 is applied to the input shaft 21 via the reactive-force transmission mechanism 102.

The reactive-force applying mechanism 100 gives a steering feeling to the driver by producing the steering reactive force against the steering force of the steering wheel 11 by the driver.

With reference to also FIG. 1, the arbitrary angle stopper 110 is capable of changing the steering range of the steering wheel 11 (see FIG. 1) as appropriate in accordance with the running state of the vehicle, the state of the steering device. When, for example, the load on the turning unit 14 becomes equal to or greater than a predetermined load that is set in advance (i.e., overload), the arbitrary angle stopper 110 restricts the steering range of the steering wheel 11. More specifically, the turn of the steering wheel 11 is to be restricted.

According to conventional technologies, when the turn wheel 13 is stuck or hits an obstacle like a curbstone, in order to let the driver to perceive such an event, the control unit 16 causes the clutch 15 to be latched, or causes the reactive-force applying mechanism 100 to produce reactive force that disables the driver to turn the steering wheel. Accordingly, since the turning unit 14, the clutch 15, and the reactive-force applying mechanism 100 need to have a strength that can withstand against large load, those components are inevitably become large in size.

In contrast, according to this embodiment, the arbitrary angle stopper 110 that has received the control signal from the control unit 16 restricts the steering range so as to disrupt a turn increase operation on the steering wheel 11. Consequently, a large load is not to be applied to the clutch 15 and to the reactive-force applying mechanism 100. This enables downsizing of the clutch 15 and of the reactive-force applying mechanism 100.

The arbitrary angle stopper 110 includes a locking wheel 111 that rotates together with the input shaft 21, and the stopper main body 112 which is provided so as to be forwardly or backwardly movable relative to the locking wheel 111, and which is capable of contacting the locking wheel 111 by forward movement.

The stopper main body 112 is a solenoid fastened to the housing 61. The stopper main body 112 causes, in response to the electrical signal from the control unit 16, a rod 112a to move forwardly toward the locking wheel 111. Contact of the rod 112a with the locking wheel 111 restricts the rotation of the input shaft 21.

Next, an action of the present disclosure will be described.

Figure 6A:
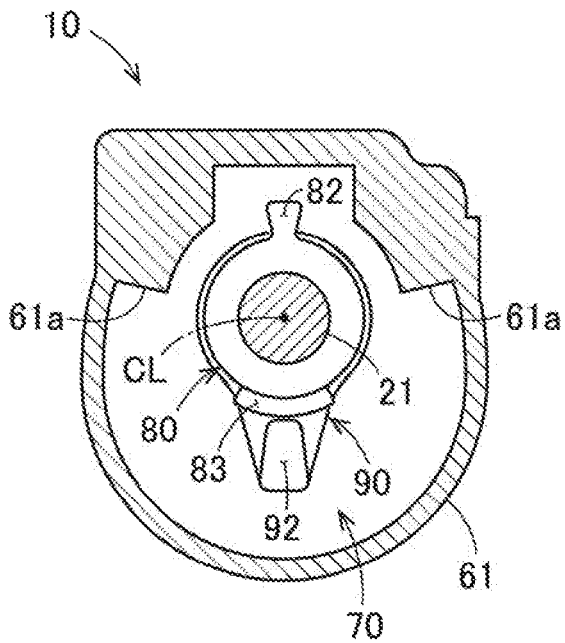
FIG. 6A is a diagram illustrating a state in which the first member rotates with a first protrusion not abutting a second protrusion.

With reference to FIG. 6A, when the steering wheel 11 (see FIG. 1) is turned in the counterclockwise direction, the input shaft 21 and the first member 80 are also rotated in the counterclockwise direction. In the state illustrated in the figure, the first protrusion 82 does not abut the second protrusion 92. With the first protrusion 82 not abutting the second protrusion 92, the second member 90 does not rotate. That is, with the first protrusion 82 not abutting the second protrusion 92, the input shaft 21 and the first member 80 rotate without an engagement with the second member 90.

Figure 6B:
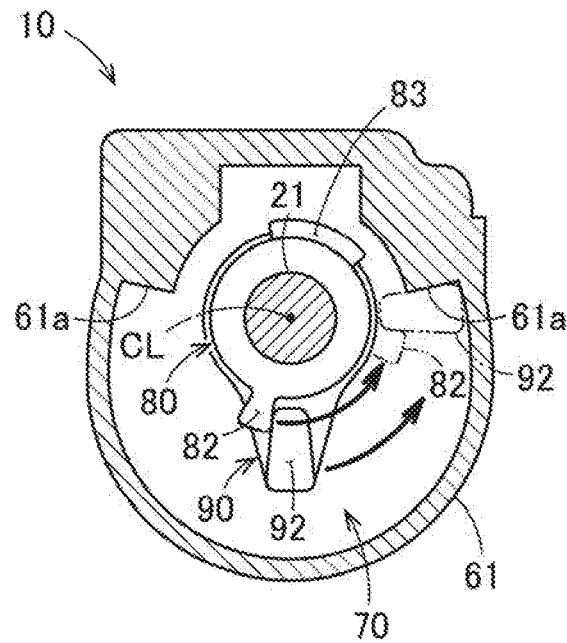
FIG. 6B is a diagram illustrating a state until the second protrusion contacts a stopper with the first protrusion abutting the second protrusion.

With reference to also FIG. 6B, the second protrusion 92 is placed on the trajectory of the first protrusion 82. Hence, the first protrusion 82 abuts the second protrusion 92 (FIG. 6B) by turning the steering wheel 11 from the state illustrated in FIG. 6A. The second protrusion 92 is pushed by the first protrusion 82 by further turning the steering wheel 11 from this state. Consequently, the second member 90 rotates together with the first member 80.

Further turning the steering wheel 11 causes the second protrusion 92 to contact the stopper 61a (see dotted lines in FIG. 6B). The contact of the second protrusion 92 with the stopper 61a restricts the turning of the steering wheel 11.

Figure 6C:
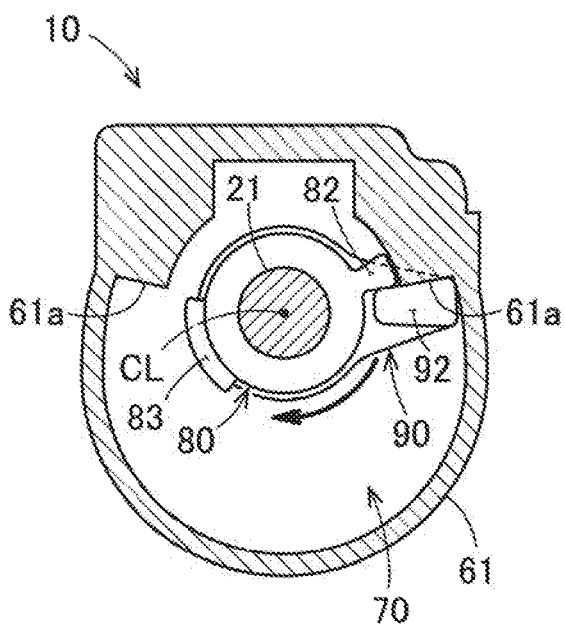
FIG. 6C is a diagram illustrating a state in which the first member is rotated in the clockwise direction.

With reference to FIG. 6B and FIG. 6C, the steering wheel 11 is turned in the clockwise direction from the state indicated by the dotted lines in FIG. 6B. This causes the first protrusion 82 to become apart from the second protrusion 92, and allows only the first member 80 to rotate. By continuously turning the steering wheel 11, as illustrated in FIG. 6C, the first protrusion 82 abuts the second protrusion 92 from the lower part thereof.

Figure 6D:
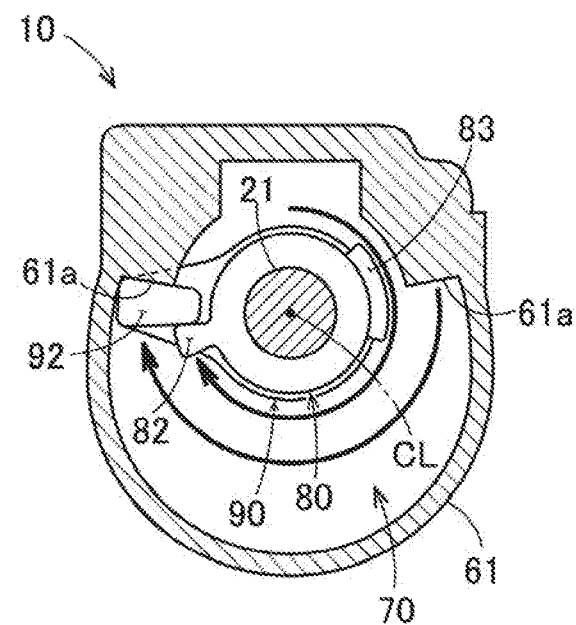
FIG. 6D is a diagram illustrating a state in which the first member and the second member rotate in the clockwise direction and contact the stopper.

With reference to FIG. 6C and FIG. 6D, when the steering wheel 11 is further turned, the second protrusion 92 is pushed by the first protrusion 82. Consequently, the second member 90 rotates together with the first member 80.

Further turning the steering wheel 11 causes the second protrusion 92 to contact the stopper 61a (see FIG. 6D). The contact of the second protrusion 92 with the stopper 61a restricts the turning of the steering wheel 11.

The steering device 10 according to the first embodiment can be summarized as follows.

With reference to FIG. 1 and FIG. 5, the steering device 10 includes:

the first member 80 which includes the first base 81 surrounding the input shaft 21 to be rotated when the steering wheel 11 is turned, and rotatable together with the input shaft, the first protrusion 82 protruding from the first base 81 in the radial direction or in the axial direction, and the first weight 83 provided on the first base 81 so as to make the weighted center G1 consistent with the center CL of the input shaft 21;

the second member 90 which includes the second base 91 surrounding the first base 81, and the second protrusion 92 protruding from the second base 91 and on the trajectory of the first protrusion 82, the second member being rotatable together with the first member 80 with the first protrusion 82 being abutting the second protrusion 92, the weighted center G2 being located between the center CL of the input shaft 21 and the second protrusion 92; and the stoppers 61a and 61a which are apart from the second protrusion 92, and are formed above the center CL of the input shaft 21 on the trajectory of the second protrusion 92 when the weighted center G2 of the second member 90 is located below the center CL of the input shaft 21, and are capable of restricting the turn of the steering wheel 11 via the input shaft 21 when abutting with the second protrusion 92.

The first member 80 includes the first weight 83 that is provided on the first base 81 so as to make the weighted center G1 consistent with the center CL of the input shaft 21. That is, the weighted center G1 of the first member 80 is located on the center CL of the input shaft 21. Hence, in a state in which, like a parking, a person in the vehicle does not touch the steering wheel 11, no load in the rotation direction is applied to the first member 80. The steering wheel 11 is being prevented from being turned rotational force of the first member 80 via the input shaft 21. Accordingly, a technology which is capable of restricting the turnable angle of the steering wheel 11 and which causes the steering wheel 11 to be turned as appropriate is provided.

In addition, when the first member 80 is viewed from the front side, the first weight 83 is placed so as to overlap the line L1 extended from the first protrusion 82 and passing through the center CL of the input shaft 21.

That is, the first weight 83 is placed so as to be opposite to the first protrusion 82. The weighted center G1 of the first member 80 can be easily offset toward the first protrusion 82 by what corresponds to the protrusion from the first base 81. By placing the first weight 83 so as to include the portion opposite to the first protrusion 82, the weighted center G1 of the first member 80 can be aligned with the input shaft 21 by the further small weight 83.

Moreover, the position of the weighted center G2 of the second member 90 is offset relative to the center CL of the input shaft 21, and the stoppers 61a and 61a are formed outwardly relative to the trajectory of rotation of the second protrusion by the gravity from the maximum reachable position where the second protrusion 92 abuts the first protrusion 82 and is rotatable to the standstill position balanced by the gravity.

The second member 90 is provided so as to be rotated without an engagement with the first member 80, and the position of the weighted center G2 of the second member 90 is offset relative to the center CL of the input shaft 21. Hence, in a normal state, the second member 90 is directed in such a way that the weighted center G2 of the second member 90 is located below the input shaft 21. In contrast, the stoppers 61a and 61a are formed at positions apart from the second protrusion 92. This prevents the second protrusion 92 from contacting the stoppers 61a and 61a in the normal state. This suppresses contact sounds produced when the second protrusion 92 contacts the stoppers 61a and 61a, thereby improving the quietness.

Next, a second embodiment according to the present disclosure will be described with reference to the figures.

Second Embodiment

FIG. 7 illustrates the major section of a steering device according to the second embodiment, and the illustration thereof corresponds to that of FIG. 5. According to a steering device 10A of the second embodiment, the structure of a steering angle restricting device 70A differs from that of the steering device 10 of the first embodiment (see FIG. 2). Other basic structures are common to those of the steering device according to the first embodiment. The common component to that of the first embodiment will be denoted by the same reference numeral, and the detailed description thereof will be omitted.

Figure 8:
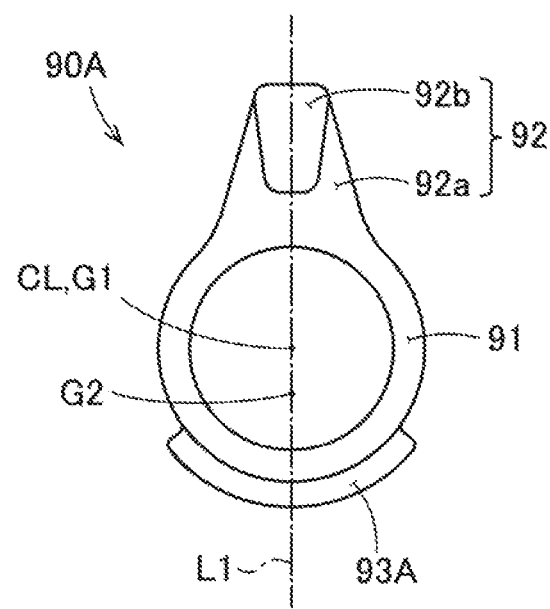
FIG. 8 is a front view of a second member illustrated in FIG. 7.

With reference to also FIG. 8, a second member 90A includes a second weight 93A provided on the second base 91. The second weight 93A is placed so as to overlap the line L1 extended from the second protrusion 92 and passing through the center CL of the input shaft 21. The second weight 93A is provided along the outer circumference of the second base 91.

The weighted center G2 of the second member 90A is located between the center CL of the input shaft 21 and the tip of the second weight 93A. Since the weighted center G2 of the second member 90A is located between the center CL of the input shaft 21 and the tip of the second weight 93A, in the normal state, the second weight 93A is located at the lower side, and the second protrusion 92 is located at the upper side.

The stoppers 61a and 61a are formed at positions apart from the second protrusion 92 when the second protrusion 92 is located at the upper side. The stoppers 61a and 61a are located below the center CL of the input shaft 21. The distance from the second protrusion 92 to each of the stoppers 61a and 61a is uniform.

The steering device 10A according to the second embodiment can be summarized as follows.

With reference to FIG. 1 and FIG. 7, the steering device 10A includes:

the first member 80 which includes the first base 81 surrounding the input shaft 21 to be rotated when the steering wheel 11 is turned, and rotatable together with the input shaft, the first protrusion 82 protruding from the first base 81 in the radial direction or in the axial direction, and the first weight 83 provided on the first base 81 so as to make the weighted center G1 consistent with the center CL of the input shaft 21;

the second member 90A which includes the second base 91 surrounding the first base 81, the second protrusion 92 protruding from the second base 91 and on the trajectory of the first protrusion 82, and the second weight 93A placed so as to overlap the line L1 extended from the second protrusion 92 and passing through the center CL of the input shaft 21, the second member being rotatable together with the first member 80 with the first protrusion 82 being abutting the second protrusion 92, the weighted center G2 being located between the center CL of the input shaft 21 and the tip of the second weight 93A; and the stoppers 61a and 61a which are apart from the second protrusion 92 and are formed on the trajectory of the second protrusion 92 when the weighted center G2 of the second member 90A is located below the center CL of the input shaft 21, and are capable of restricting the turn of the steering wheel 11 via the input shaft 21 when abutting with the second protrusion 92.

The steering device 10A according to the second embodiment also accomplishes the predetermined advantageous effects of the present disclosure.

In addition, the second member 90A includes the second weight 93A. This enables an adjustment of the position of the weighted center G2 of the second member 90A as appropriate.

Moreover, the second weight 93A is placed, when the second member 90A is viewed from the front side, so as to overlap the line L1 extended from the second protrusion 92 and passing through the center CL of the input shaft 21.

The weighted center G2 of the second member 90A is located between the center CL of the input shaft 21 and the tip of the second weight 93A.

This enables a placement of the second protrusion 92 directed upwardly in the normal state, and a placement of the stoppers 61a and 61a at the lower side. Accordingly, the stoppers 61a and 61a can be formed at the lower side, thereby shifting the weighted center of the steering angle restricting device 70A toward the lower side.

Next, a third embodiment according to the present disclosure will be described with reference to the figure.

Third Embodiment

Figure 9:
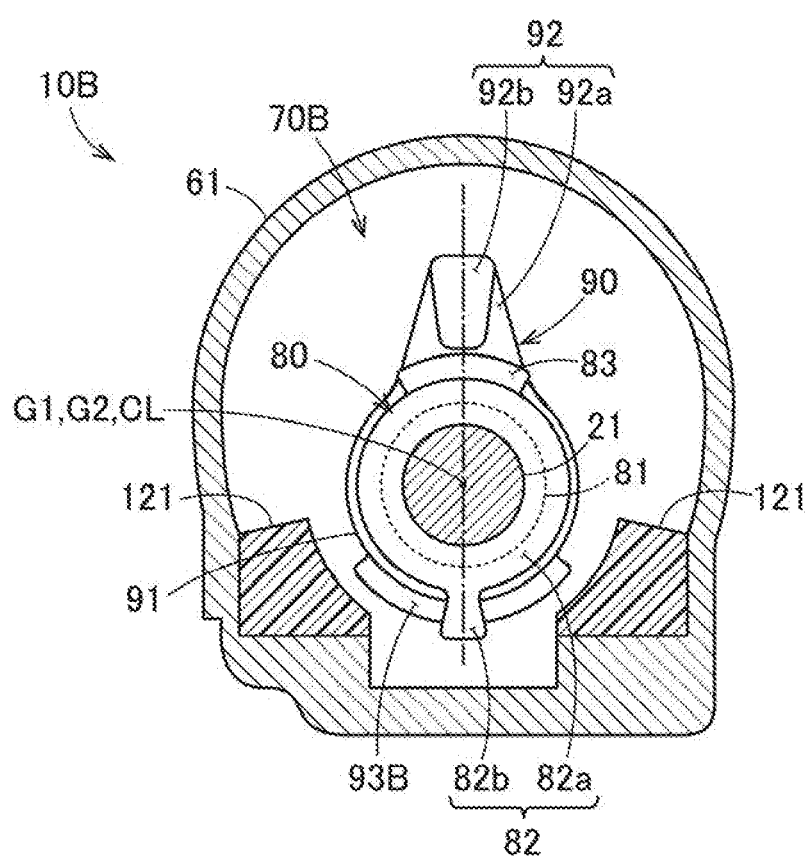
FIG. 9 is a diagram for describing a major section of a steer-by-wire steering device according to a third embodiment.

FIG. 9 illustrates the major section of a steering device according to the third embodiment, and the illustration thereof corresponds to that of FIG. 5. According to a steering device 10B of the third embodiment, the structure of a steering angle restricting device 70B differs from that of the steering device 10 of the first embodiment (see FIG. 2). Other basic structures are common to those of the steering device according to the first embodiment. The common component to that of the first embodiment will be denoted by the same reference numeral, and the detailed description thereof will be omitted.

The second member 90B includes a second weight 93B provided on the second base 91. The second weight 93B is placed so as to overlap the line L1 extended from the second protrusion 92 and passing through the center CL of the input shaft 21.

The weighted center G2 of the second member 90B is consistent with the center CL of the input shaft 21. That is, the weighted center G1 of the first member 80 and the weighted center G2 of the second member 90B are both located on the center CL of the input shaft 21.

Stoppers 121 and 121 are formed of, for example, a rubber that is a separate component from the housing 61. When a structure in which the stoppers 121 and 121 are formed as separate components from the housing 61, in addition to the above material, a soft resin, etc., is also applicable. This ensures the quietness when the second protrusion 92 abuts the stoppers 121 and 121.

The steering device 10B according to the third embodiment as described above can accomplish the predetermined advantageous effects of the present disclosure.

Moreover, the second member 90B further includes the second weight 93B, and the weighted center G2 of the second member 90B is consistent with the center CL of the input shaft 21. When the second member 90B rotates without an engagement with the first member 80, the rotational force by the second member 90B is applied to the input shaft 21 by what corresponds to frictional force produced between the first member 80 and the second member 90B. By making the weighted center G2 of the second member 90B consistent with the center CL of the input shaft 21, the rotation of the second member 90B without an engagement is suppressed, and an application of a load to be applied to the input shaft 21 by the rotation of the second member 90B is suppressed.

Next, a fourth embodiment according to the present disclosure will be described with reference to the figure.

Fourth Embodiment

FIG. 10 illustrates the major section of a steering device according to the fourth embodiment, and the illustration thereof corresponds to that of FIG. 5. According to a steering device 10C of the fourth embodiment, the locations where the stoppers 61a and 61a are provided differ from those of the steering device 10 according to the first embodiment (see FIG. 2). Other basic structures are common to those of the steering device according to the first embodiment. The common component to that of the first embodiment will be denoted by the same reference numeral, and the detailed description thereof will be omitted.

The stoppers 61a and 61a are formed at lower locations than the center CL of the input shaft 21. The weighted center of the second member 90 is offset relative to the center CL of the input shaft 21 by what corresponds to the protruding second protrusion 92 from the second base 91. With the second protrusion 92 not abutting the first protrusion 82, the second member 90 may be rotated by the own weight of the second protrusion 92. This may keep the second protrusion 92 abutting either one of the stoppers 61a and 61a.

The steering device 10C according to the fourth embodiment as described above can also accomplish the predetermined advantageous effects of the present disclosure.

Note that the respective embodiments can be combined with each other. For example, the stoppers 121 and 121 which are separate components and described in the third embodiment may be applied to the steering device of the first embodiment and to that of the second embodiment. Moreover, the stoppers 61a and 61a which are formed integrally with the housing 61 and described in the first and second embodiments may be applied to the steering device of the third embodiment. The present disclosure is not limited to the above-described embodiments as far as the actions and advantageous effects of the present disclosure are achievable.

INDUSTRIAL APPLICABILITY

The steering device according to the present disclosure is suitably built in a vehicle like a passenger automobile.

REFERENCE SIGNS LIST 10, 10A, 10B, 10C Steer-by-wire steering device
11 Steering wheel
21 Input shaft
61a, 121 Stopper
80 First member
81 First base
82 First protrusion
83 First weight
90, 90A, 90B Second member
91 Second base
92 Second protrusion
93, 93A, 93B Second weight
CL Center of input shaft
G1 Weighted center of first member
G2 Weighted center of second member

The invention claimed is:

1. A steer-by-wire steering device comprising:
   a first member which comprises a first base surrounding an input shaft to be rotated when a steering wheel is turned, and rotatable together with the input shaft, a first protrusion protruding from the first base in a radial direction or in an axial direction, and a first weight provided on the first base so as to make a weighted center of the first member consistent with a center of the input shaft;
   a second member which comprises a second base surrounding the first base, and a second protrusion protruding from the second base and on a trajectory of the first protrusion, the second member being rotatable together with the first member with the first protrusion abutting the second protrusion; and
   a stopper which is provided on a trajectory of the second protrusion, and is capable of restricting the turn of the steering wheel via the input shaft when abutting with the second protrusion.

2. The steer-by-wire steering device according to claim 1, wherein when the first member is viewed from a front side, the first weight is placed so as to overlap a line extended from the first protrusion and passing through the center of the input shaft.

3. The steer-by-wire steering device according to claim 2, wherein:
   a position of a weighted center of the second member is offset relative to the center of the input shaft by the second protrusion; and
   the stopper is formed outwardly relative to a trajectory of rotation of the second protrusion of the second member by a gravity from a maximum reachable position where the second protrusion of the second member abuts the first protrusion and is rotatable to a standstill position balanced by the gravity.

4. The steer-by-wire steering device according to claim 3, wherein the second member further comprises a second weight.

5. The steer-by-wire steering device according to claim 4, wherein the second weight forms a weighted center of the second member so as to rotate, when the second protrusion rotates from a maximum reachable position where the second protrusion abuts the first protrusion and is rotatable to a standstill position balanced by the gravity, the second protrusion from the maximum reachable position and in a direction becoming apart from the stopper.

6. The steer-by-wire steering device according to claim 2, wherein the second member further comprises a second weight.

7. The steer-by-wire device according to claim 6, wherein the second weight forms a weighted center of the second member so as to rotate, when the second protrusion rotates from a maximum reachable position where the second protrusion abuts the first protrusion and is rotatable to a standstill position balanced by the gravity, the second protrusion from the maximum reachable position and in a direction becoming apart from the stopper.

8. The steer-by-wire steering device according to claim 1, wherein:
   a position of a weighted center of the second member is offset relative to the center of the input shaft by the second protrusion; and
   the stopper is formed outwardly relative to a trajectory of rotation, a gravity of the second protrusion of the second member a maximum reachable position where the second protrusion of the second member abuts the first protrusion and is rotatable to a standstill position balanced by the gravity.

9. The steer-by-wire steering device according to claim 8, wherein the second member further comprises a second weight.

10. The steer-by-wire steering device according to claim 9, wherein the second weight forms a weighted center of the second member so as to rotate, when the second protrusion rotates from a maximum reachable position where the second protrusion abuts the first protrusion and is rotatable to a standstill position balanced by the gravity, the second protrusion from the maximum reachable position and in a direction becoming apart from the stopper.

11. The steer-by-wire steering device according to claim 1, wherein the second member further comprises a second weight.

12. The steer-by-wire steering device according to claim 11, wherein the second weight forms a weighted center of the second member so as to rotate, when the second protrusion rotates from a maximum reachable position where the second protrusion abuts the first protrusion and is rotatable to a standstill position balanced by the gravity, the second protrusion from the maximum reachable position and in a direction becoming apart from the stopper.

13. The steer-by-wire steering device according to claim 1, wherein:
the second member further comprises a second weight; and
a weighted center of the second member is consistent with the center of the input shaft.

14. A vehicle comprising the steer-by-wire steering device according claim 1.

15. A steer-by-wire steering device comprising:
a first member which comprises a first base surrounding an input shaft to be rotated when a steering wheel is turned, and rotatable together with the input shaft, a first protrusion protruding from the first base in a radial direction or in an axial direction, and a first weight provided on the first base so as to make a weighted center of the first member consistent with a center of the input shaft;
a second member which comprises a second base surrounding the first base, and a second protrusion protruding from the second base and on a trajectory of a first protrusion, the second member being rotatable together with the first member with the first protrusion abutting the second protrusion, a weighted center of the second member being located between the center of the input shaft and the second protrusion; and
a stopper which is apart from the second protrusion, and is formed above the center of the input shaft on a trajectory of the second protrusion, when the weighted center of the second member is located below the center of the input shaft, and is capable of restricting a turn of the steering wheel via the input shaft when abutting with the second protrusion.

16. A vehicle comprising the steer-by-wire steering device according to claim 15.

17. A steer-by-wire steering device comprising:
a first member which comprises a first base surrounding an input shaft to be rotated when a steering wheel is turned, and rotatable together with the input shaft, a first protrusion protruding from the first base in a radial direction or in an axial direction, and a first weight provided on the first base so as to make a weighted center of the first member consistent with a center of the input shaft;
a second member which comprises a second base surrounding the first base, a second protrusion protruding from the second base and on a trajectory of the first protrusion, and a second weight placed so as to overlap a line extended from the second protrusion and passing through the center of the input shaft, the second member being rotatable together with the first member with the first protrusion abutting the second protrusion, a weighted center of the second member being located between the center of the input shaft and tip of the second weight; and
a stopper which is apart from the second protrusion and is formed on the trajectory of the second protrusion when the weighted center of the second member is located below the center of the input shaft, and is capable of restricting a turn of the steering wheel via the input shaft when abutting with the second protrusion.

18. A vehicle comprising the steer-by-wire steering device according to claim 17.

* * * * *